US011234889B2

(12) United States Patent
Guo et al.

(10) Patent No.: US 11,234,889 B2
(45) Date of Patent: Feb. 1, 2022

(54) UPPER LIMB ASSIST SYSTEM

(71) Applicants: BEIJING BOE OPTOELECTRONICS TECHNOLOGY CO., LTD., Beijing (CN); BOE TECHNOLOGY GROUP CO., LTD., Beijing (CN)

(72) Inventors: Shaofei Guo, Beijing (CN); Zhonghua Li, Beijing (CN); Wei Gong, Beijing (CN); Shipeng Wang, Beijing (CN); Jian Sang, Beijing (CN)

(73) Assignees: Beijing BOE Optoelectronics Technology Co., Ltd.; BOE TECHNOLOGY GROUP CO., LTD.

( * ) Notice: Subject to any disclaimer, the term of this patent is extended or adjusted under 35 U.S.C. 154(b) by 230 days.

(21) Appl. No.: 16/523,111

(22) Filed: Jul. 26, 2019

(65) Prior Publication Data

US 2020/0206061 A1    Jul. 2, 2020

(30) Foreign Application Priority Data

Jan. 2, 2019    (CN) .......................... 201920003916.0

(51) Int. Cl.
*A61H 1/02*    (2006.01)
*B25J 9/00*    (2006.01)

(52) U.S. Cl.
CPC ......... *A61H 1/0274* (2013.01); *A61H 1/0277* (2013.01); *A61H 1/0285* (2013.01); *B25J 9/0006* (2013.01); *A61H 2201/1215* (2013.01); *A61H 2201/165* (2013.01); *A61H 2201/1623* (2013.01); *A61H 2201/1638* (2013.01);

(Continued)

(58) Field of Classification Search
CPC .. A61H 1/0274; A61H 1/0277; A61H 1/0285; A61H 2201/1215; A61H 2201/1638; A61H 2201/165; A61H 2201/1671; A61H 2201/5069; B25J 9/0006
See application file for complete search history.

(56) References Cited

U.S. PATENT DOCUMENTS

| | | | |
|---|---|---|---|
| 2010/0204804 A1* | 8/2010 | Garrec .................. | B25J 9/0006 623/24 |
| 2017/0296418 A1* | 10/2017 | Lee ...................... | A61H 1/0277 |

(Continued)

FOREIGN PATENT DOCUMENTS

| | | |
|---|---|---|
| CN | 103465253 B | 10/2015 |
| CN | 107671848 A | 2/2018 |
| CN | 107984461 A | 5/2018 |

*Primary Examiner* — Jerrah Edwards
*Assistant Examiner* — Aren Patel
(74) *Attorney, Agent, or Firm* — The Webb Law Firm (57) ABSTRACT

The present disclosure relates to an upper limb assist system including a back bracket, an arm bracket, a motor, and driving belts, wherein the arm bracket includes an upper arm, a forearm, and a hand portion, two ends of the forearm are configured to be rotatably coupled to the upper arm and the hand portion respectively, the upper arm is configured to be rotatably coupled to the back bracket, the upper limb assist system further includes driving members and corresponding rotating wheels disposed on the upper arm, the forearm and the hand portion respectively, wherein the driving member is configured to have a first state and a second state.

17 Claims, 7 Drawing Sheets

(52) U.S. Cl.
CPC .............. *A61H 2201/1671* (2013.01); *A61H 2201/5069* (2013.01)

(56) References Cited

U.S. PATENT DOCUMENTS

2019/0344456 A1* 11/2019 Baptista ................ B25J 9/0006
2020/0069441 A1* 3/2020 Larose .................... F16D 37/02

* cited by examiner

UPPER LIMB ASSIST SYSTEM

CROSS-REFERENCE TO RELATED APPLICATIONS

The present application claims priority to Chinese Patent Application No. 201920003916.0, filed on Jan. 2, 2019, and entitled, "UPPER LIMB ASSIST SYSTEM", the disclosure of which is hereby incorporated by reference in its entirety.

FIELD OF THE INVENTION

The present disclosure relates to an upper limb assist system.

BACKGROUND

Upper limb assist systems drive the movement of the shoulder joint, the elbow joint and the wrist joint by a driving mechanism such as a motor, and can be applied to the rehabilitation of the upper limb of the human body in medical rehabilitation. These systems can also assist the manual loading/unloading of cargoes, and are getting more and more extensive applications.

DISCLOSURE OF THE INVENTION

According to an aspect of the present disclosure, an upper limb assist system is provided, including a back bracket, an arm bracket, a motor, and driving belts, wherein the arm bracket includes an upper arm, a forearm, and a hand portion, two ends of the forearm are configured to be rotatably coupled to the upper arm and the hand portion respectively, the upper arm is configured to be rotatably coupled to the back bracket, the upper limb assist system further includes driving members and corresponding rotating wheels disposed on the upper arm, the forearm and the hand portion respectively, wherein the driving member is configured to have a first state and a second state; in the first state, the driving member is configured to drive the upper arm, the forearm or the hand portion where the driving member is located to rotate with the snap ring rotation of the corresponding rotating wheel; in the second state, the driving member is configured to stop driving the rotation of the upper arm, the forearm or the hand portion where the driving member is located, the motor is disposed on the arm bracket or the back bracket, and a running wheel of the motor is configured to be directly or indirectly coupled to each of the rotating wheels via the driving belts to cause each of the rotating wheels to rotate when the motor is running.

According to some embodiments of the present disclosure, the driving member include a first magnetic member disposed on the arm bracket, a second magnetic member disposed on the rotating wheel and opposite to the first magnetic member, and an elastic member, at least one of the first magnetic member and the second magnetic member is an electromagnet; in the first state, the electromagnet is energized to make the first magnetic member and the second magnetic member attract each other to overcome an elastic force of the elastic member, so that the first magnetic member is attached to the second magnetic member, and the second magnetic member is driven to rotate when the first magnetic member rotates; in the second state, the electromagnet is de-energized, magnetic attraction between the first magnetic member and the second magnetic member disappears, and the elastic force of the elastic member separates the first magnetic member from the second magnetic member.

According to some embodiments of the present disclosure, the first magnetic member and the second magnetic member are provided with a friction structure on opposite sides of the first magnetic member and the second magnetic member.

According to some embodiments of the present disclosure, the elastic member is disposed between the first magnetic member and the second magnetic member.

According to some embodiments of the present disclosure, the elastic member and the second magnetic member are disposed on two sides of the first magnetic member respectively.

According to some embodiments of the present disclosure, the rotating wheel is configured to be fixedly coupled to the arm bracket, the driving member includes wheel teeth provided on the rotating wheel, an inner surface of the driving belt is provided with belt teeth engaged with the wheel teeth, in the first state, the wheel teeth are configured to stick out of a surface of the rotating wheel to engage with the belt teeth, in the second state, the wheel teeth are configured to retract into the rotating wheel to disengage with the belt teeth.

According to some embodiments of the present disclosure, the arm bracket further comprises electromagnetic push rods disposed on the upper arm, the forearm and/or the hand portion, the electromagnetic push rod comprises a main body, a push rod slidably disposed in the main body and a holding portion connected to the push rod, when the electromagnetic push rod is energized, the push rod is configured to push the holding portion to move away from the main body, so that the holding portion holds an end portion of the back bracket, the upper arm or the forearm, thereby fixing the upper arm, the forearm or the hand portion where the electromagnetic push rod is located; when the electromagnetic push rod is de-energized, the push rod is configured to move toward the main body to drive the holding portion to be separated from the corresponding end portion.

According to some embodiments of the present disclosure, the end portions of the back bracket, the upper arm and the forearm are arc-shaped, and the holding portions are curved plates fitted to the respective end portions.

According to some embodiments of the present disclosure, the back bracket is provided with a first fixing belt, and the upper arm, the forearm and the hand portion are provided with second fixing belts respectively According to some embodiments of the present disclosure, two arm brackets are configured to be coupled to opposite sides of the back bracket respectively.

According to some embodiments of the present disclosure, the length of the back bracket between the two arm brackets is adjustable.

According to some embodiments of the present disclosure, the upper arm, the forearm and/or the hand portion are provided with angle sensors for monitoring the angle of rotation of the upper arm, the forearm or the hand.

According to some embodiments of the present disclosure, the back bracket, the upper arm and a corresponding rotating wheel are coupled together by a first rotating shaft.

According to some embodiments of the present disclosure, an end of the upper arm and an end of the back bracket are provided with through holes respectively, and a first thrust bearing is disposed in the through hole on the back bracket, wherein the first rotating shaft is configured to pass through the first thrust bearing, the through hole of the rotating wheel, thereby coupling the upper arm and the back bracket and the corresponding rotating wheel together.

According to some embodiments of the present disclosure, both ends of the first rotating shaft are provided with support bearings respectively.

According to some embodiments of the present disclosure, a snap ring is fixed to an outer side of the support bearing.

According to some embodiments of the present disclosure, the upper arm, the forearm and the corresponding rotating wheel are coupled together by a second rotating shaft.

According to some embodiments of the present disclosure, the other end of the upper arm and an end of the forearm are provided with through holes respectively, and a second thrust bearing is disposed in the through hole on the other end of the upper arm, wherein the second rotating shaft is configured to pass through the second thrust bearing, the through hole of the rotating wheel, thereby coupling the upper arm and the forearm and the corresponding rotating wheel together.

According to some embodiments of the present disclosure, both ends of the second rotating shaft are provided with support bearings respectively.

According to some embodiments of the present disclosure, a snap ring is fixed to an outer side of the support bearing.

It should be understood that both the foregoing general description and the following detailed description are only exemplary and explanatory and are not restrictive of the disclosure.

BRIEF DESCRIPTION OF THE DRAWINGS

Herein, the accompanying drawings, which are incorporated in and constitute a part of this specification, illustrate embodiments of the present disclosure and, together with the description, serve to explain the principles of the present disclosure.

DETAILED DESCRIPTION OF PREFERRED EMBODIMENTS

Exemplary embodiments will be described in detail herein with examples illustrated in the accompanying drawings. When the following description refers to the accompanying drawings, the same numerals in different drawings represent the same or similar elements unless otherwise indicated. The embodiments described in the following exemplary embodiments do not represent all embodiments consistent with the present disclosure. Instead, they are merely examples of devices and methods consistent with aspects of the present disclosure as detailed in the appended claims.

Figure 1:
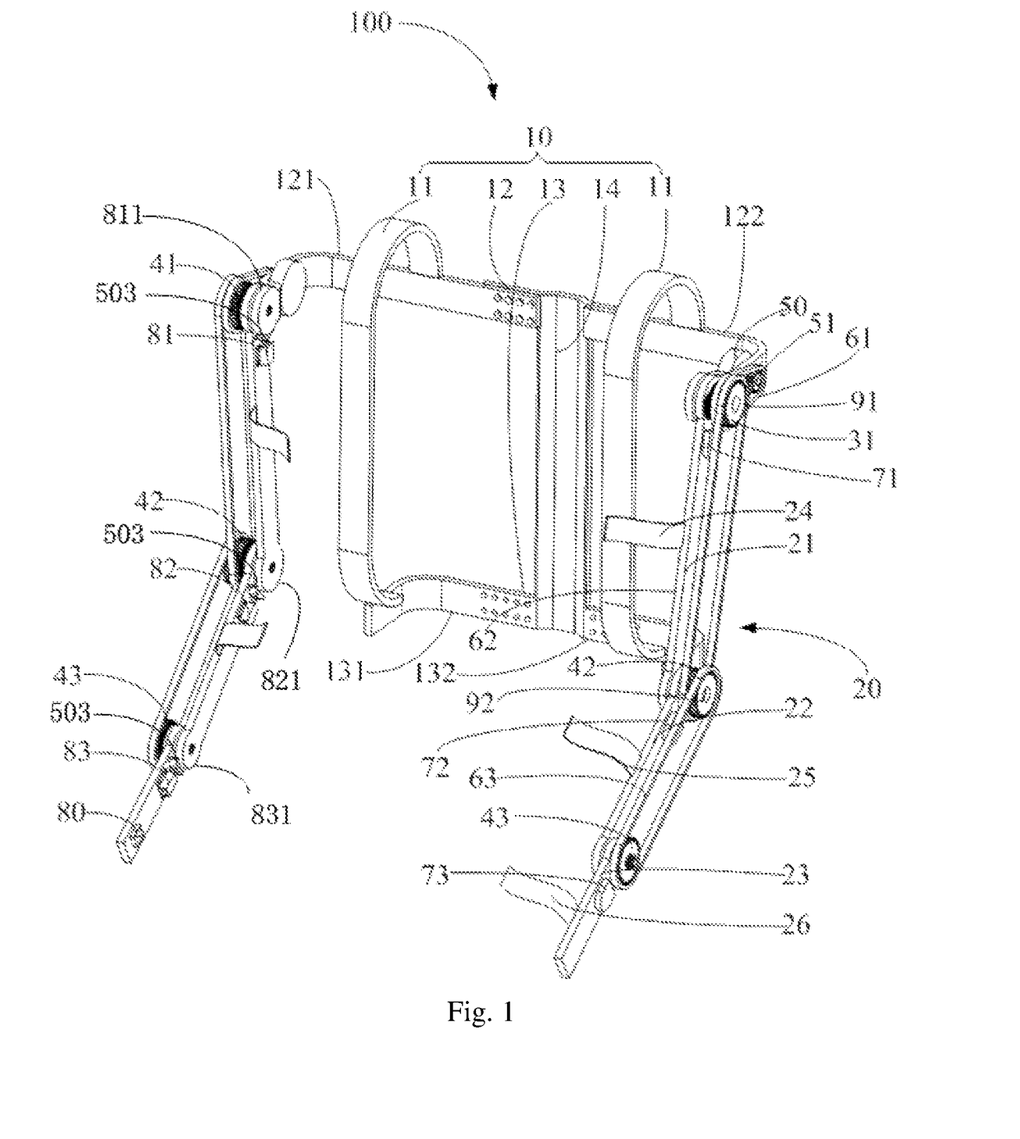
FIG. 1 is a perspective structural view of an upper limb assist system in accordance with some embodiments of the present disclosure.
Figure 2:
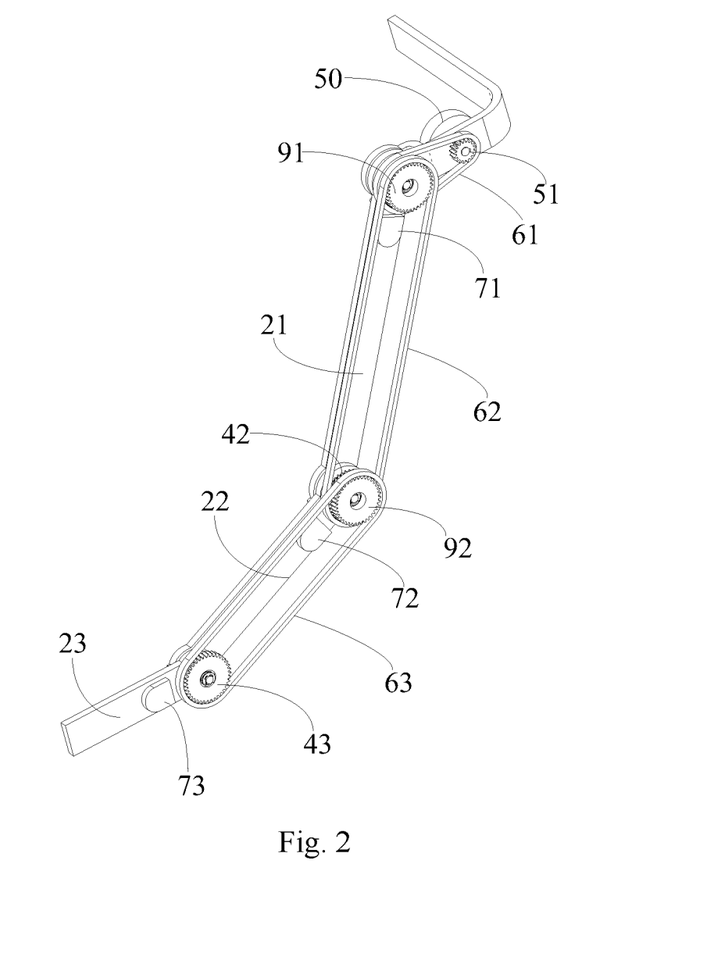
FIG. 2 is a perspective structural view at an angle of the arm bracket of the upper limb assist system shown in FIG. 1.
Figure 3:
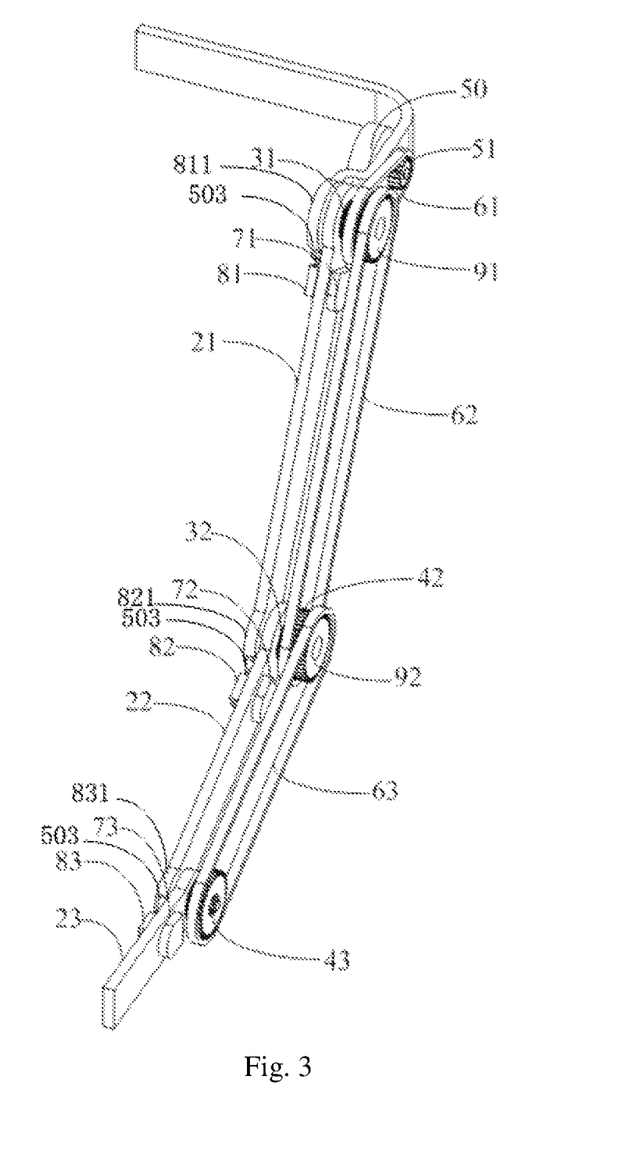
FIG. 3 is a perspective structural view at another angle of the arm bracket of the upper limb assist system shown in FIG. 1.
Figure 4:
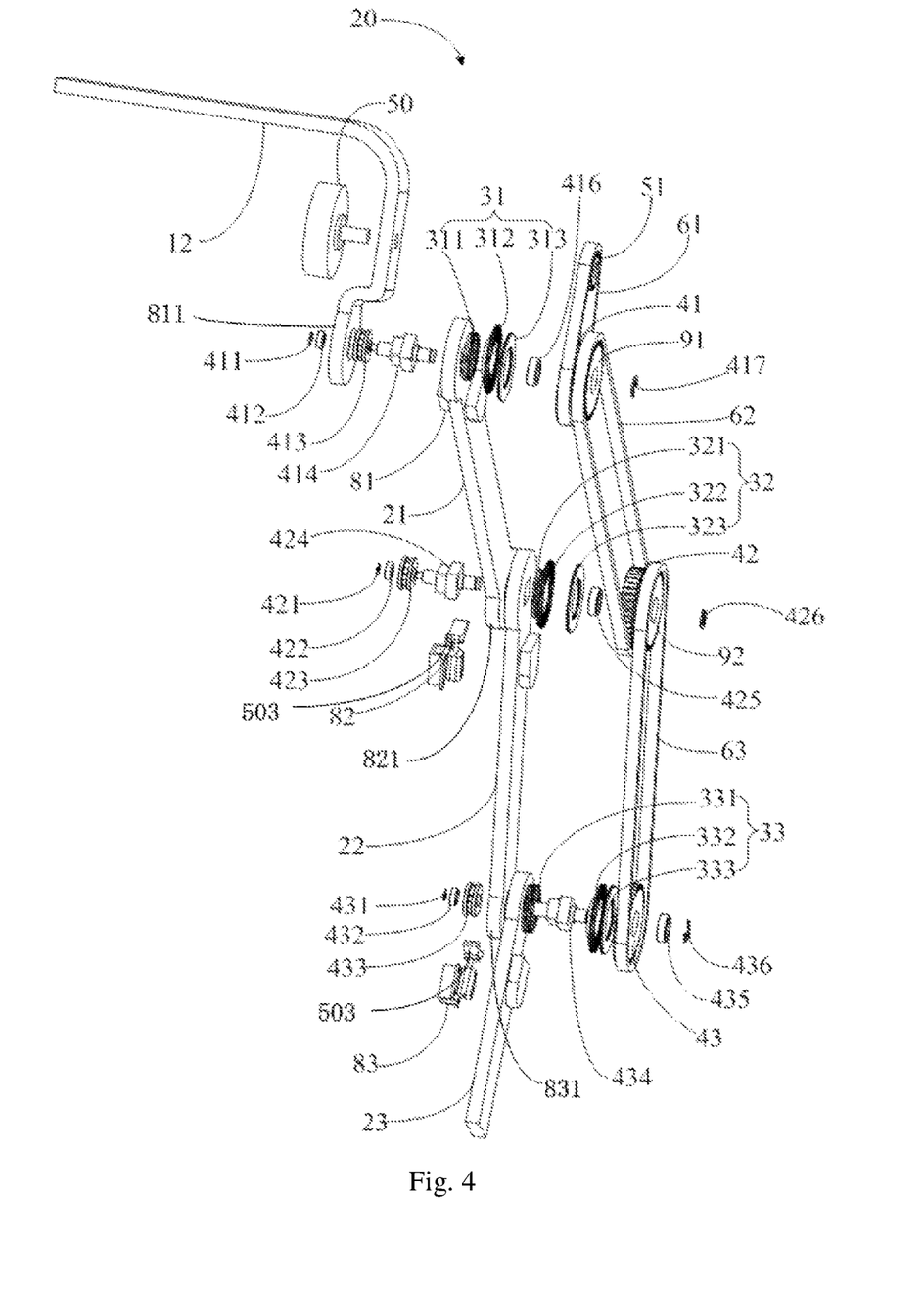
FIG. 4 is an exploded perspective view of the arm bracket shown in FIG. 3.
Figure 5:
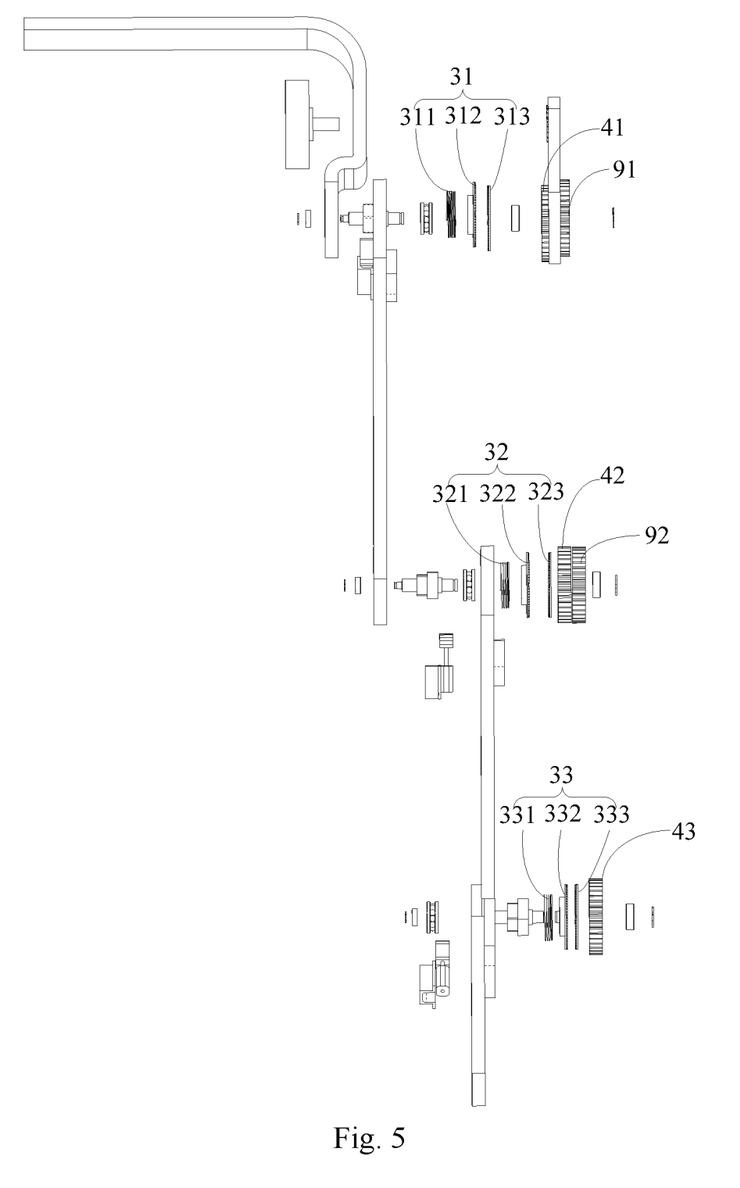
FIG. 5 is a plan exploded view of the arm bracket shown in FIG. 3.
Figure 6:
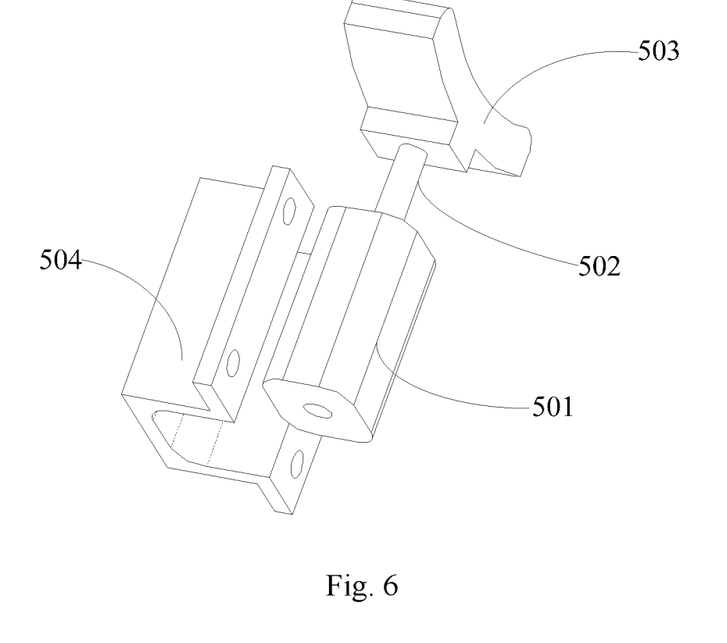
FIG. 6 is a perspective view of the magnetic push rod shown in FIG. 2.
Figure 7:
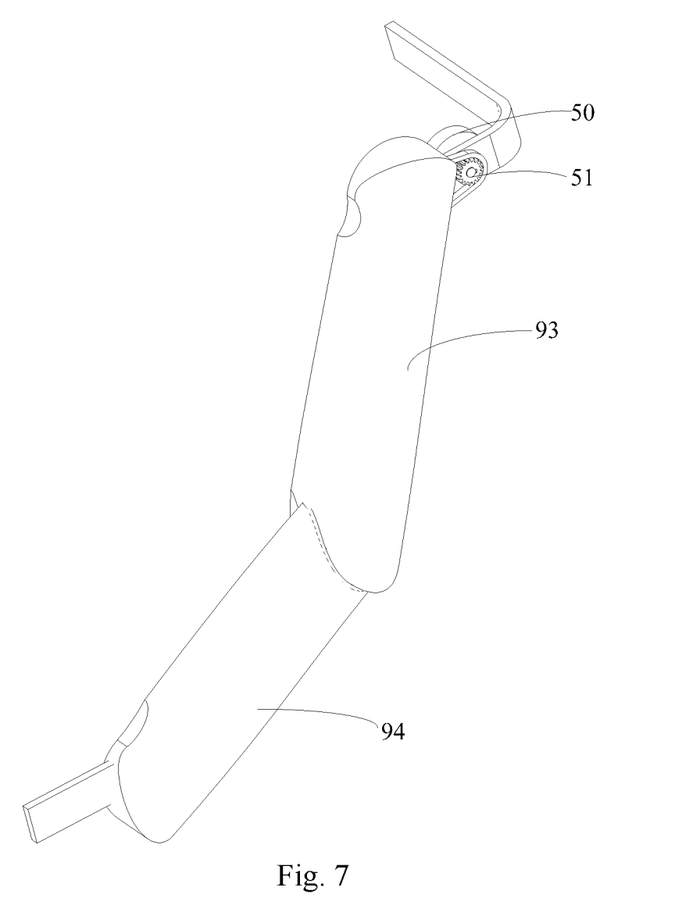
FIG. 7 is a perspective structural view of an arm bracket provided with a housing in accordance with some embodiments of the present disclosure.

FIG. 1 is a perspective structural view of an upper limb assist system in accordance with an embodiment of the present disclosure; FIG. 2 is a perspective structural view at an angle of the arm bracket of the upper limb assist system shown in FIG. 1; FIG. 3 is a perspective structural view at another angle of the arm bracket of the upper limb assist system shown in FIG. 1; FIG. 4 is an exploded perspective view of the arm bracket shown in FIG. 3; FIG. 5 is a plan exploded view of the arm bracket shown in FIG. 3; FIG. 6 is a perspective view of the magnetic push rod shown in FIG. 2; FIG. 7 is a perspective structural view of an arm bracket provided with a housing.

Referring to FIG. 1, and in conjunction with other figures as necessary, an upper limb assist system 100 provided by an embodiment of the present disclosure includes a back bracket 10, an arm bracket 20, a motor 50, and driving belts 61, 62, 63.

The arm bracket 20 includes an upper arm 21, a forearm 22, and a hand portion 23. When a user uses the upper limb assist system, the upper arm 21 is configured to assist the user's upper arm, the forearm 22 is configured to assist the user's forearm, and the hand portion 23 is configured to assist the user's hand. Two ends of the forearm 22 are rotatably coupled to the upper arm 21 and the hand portion 23 respectively, and a far end of the upper arm 21 away from the forearm 22 is rotatably coupled to the back bracket 10. The arm bracket 20 further includes a rotating wheel 41 and a driving member 31 disposed on the upper arm 21, a rotating wheel 42 and a driving member 32 disposed on the forearm 22, and a rotating wheel 43 and a driving member 33 disposed on the hand portion 23. Each of the driving members 31, 32, 33 has a first state and a second state. In the first state, the driving member 31 drives the upper arm 21 to rotate with the driving of the rotating wheel 41, the driving member 32 drives the forearm 22 to rotate with the driving of the rotating wheel 42, and the driving member 33 drives the hand portion 23 to rotate with the driving of the rotating wheel 43. In the second state, the driving member 31 stops driving the rotation of the upper arm 21, the driving member 32 stops driving the rotation of the forearm 22, and the driving member 33 stops driving the rotation of the hand portion 23.

The motor 50 is disposed on the arm bracket 20 or the back bracket 10, and a running wheel 51 of the motor 50 is directly or indirectly coupled to each of the rotating wheels 41, 42, 43 via the driving belts 61, 62, 63 to cause each of the rotating wheels 41, 42, 42 to rotate when the motor 50 is running.

In the upper limb assist system 100 provided by the embodiment of the present disclosure, the motor 50 can drive the rotating wheels 41, 42, 43 to rotate, and the rotating wheels 41, 42, 43 can drive the upper arm 21, the forearm 22 and the hand portion 23 where they are located via corresponding driving members 31, 32, 33 when the corresponding driving members 31, 32, 33 are in the first state, or stop driving the rotation of the upper arm 21, the forearm 22 and the hand portion 23 where they are located when the corresponding driving members 31, 32, 33 are in the second state. Thus, the rotation of the upper arm 21, the forearm 22 and the hand portion 23 can be separately controlled by controlling the state of the driving members 31, 32, 33 without the need to control the rotation of the upper arm, the forearm and the hand portion by different motors, thereby reducing the weight and control complexity of the upper limb assist system 100, reducing discomfort when worn on the human body, and reducing manufacturing cost. In addition, the motor 50 is coupled to the rotating wheels 41, 42, 43 via driving belts, which can be increase the flexibility of the upper limb assist system, and make it easy to wear.

Referring to FIG. 2 to FIG. 6, the upper limb assist system 100 further includes a transmission wheel 91 and a transmission wheel 92. The transmission wheel 91 and the rotating wheel 41 are disposed side by side and connected to each other. When the rotating wheel 41 rotates, the transmission wheel 91 rotates synchronously; the transmission wheel 92 and the rotating wheel 42 are disposed side by side and connected to each other. When the rotating wheel 42 rotates, the transmission wheel 92 rotates synchronously. The motor 50 may be disposed on the back bracket 10, and the running wheel 51 of the motor 50 is disposed on the outer side of the back bracket 10. The running wheel 51 of the motor 50 is coupled to the rotating wheel 41 via a driving belt 61, the transmission wheel 91 is coupled to rotating wheel 42 via a driving belt 62, and the rotating wheel 42 is coupled to the rotating wheel 43 via the driving belt 63.

When the motor 50 is running, the running wheel 51 drives the rotating wheel 41 to rotate via the driving belt 61. The rotating wheel 41 drives the transmission wheel 91 to rotate, and the transmission wheel 91 drives the rotating wheel 42 to rotate via the driving belt 62. The rotating wheel 42 drives the transmission wheel 92 to rotate. The transmission wheel 92 drives the rotating wheel 43 to rotate via the drive belt 63. Thus, the motor 50 can drive the rotating wheels 41, 42, 43 to rotate simultaneously.

Hereinafter, the rotating wheel 41 and the driving member 31 provided on the upper arm 21 will be specifically described by taking the upper arm 21 as an example.

In one embodiment, referring again to FIG. 4, the upper arm 21 is provided with a rotating wheel 41. The driving member 31 may include a first magnetic member 312 disposed on the upper arm 21, a second member 313 disposed on the rotating wheel 41 and opposite to the first magnetic member 312, and an elastic member 311. In the embodiment shown in FIG. 4, the elastic member 311 is disposed on one side of the first magnetic member 312, and the second magnetic member 313 is disposed on the other side of the first magnetic member 312. For example, the elastic member 311 may be a tension spring. In some other embodiments according to the present disclosure, the elastic member 311 may also be disposed between the first magnetic member 312 and the second magnetic member 313, for example, the elastic member 311 may be a compression spring. At least one of the first magnetic member 312 and the second magnetic member 313 is an electromagnet. Since the second magnetic member 313 is fixedly disposed on the rotating wheel 41, the second magnetic member 313 is rotated when the rotating wheel 41 rotates. In the first state, the electromagnet is energized, a magnetic attraction force is generated between the first magnetic member 312 and the second magnetic member 313, to overcome the elastic force of the elastic member 311, so that the first magnetic member 312 is attached to the second magnetic member 313, and the first magnetic member 312 can drive the second magnetic member 313 to rotate; in the second state, the electromagnet is de-energized, the magnetic attraction between the first magnetic member 312 and the second magnetic member 313 disappears, and the elastic force of the elastic member 311 separates the first magnetic member 312 from the second magnetic member 313. One of the first magnetic member 312 and the second magnetic member 313 is an electromagnet, and the other is formed from a material such as iron, cobalt or nickel. Alternatively, both of the first magnetic member 312 and the second magnetic member 313 are electromagnets.

The back bracket 10, the upper arm 21, the rotating wheel 41 and the transmission wheel 91 can be coupled together by a rotating shaft 414 (i.e., a first rotating shaft). Specifically, an end of the upper arm 21 and the end of the back bracket 10 are provided with through holes respectively. A thrust bearing 413 (i.e., a first thrust bearing) is disposed in the through hole on the back bracket 10. The rotating shaft 414 passes through the thrust bearing 413, the through holes of the rotating wheel 41 and the transmission wheel 91 to couple the upper arm 21, the back bracket 10, the rotating wheel 41, and the transmission wheel 91 together. Supporting bearings 412 and 416 are disposed at two ends of the rotating shaft 414 respectively, and snap rings 411 and 417 are fixed to the outer sides of the supporting bearings 412 and 416 respectively. Wherein, the back bracket 10 may be disposed at the inner side of the upper arm 21, the rotating wheel 41 may be disposed at the outer side of the upper arm 21, and the transmission wheel 91 is disposed at the outer side of the rotating wheel 41 to facilitate assembly.

The elastic member 311, the first magnetic member 312 and the second magnetic member 313 can be sleeved on the rotating shaft 414 and disposed between the upper arm 21 and the rotating wheel 41. Wherein, the second magnetic member 313 is fixed to the inner side of the rotating wheel 41, and the first magnetic member 312 is slidable relative to the rotating shaft 414 in the axial direction of the rotating shaft 414. The through hole on the first magnetic member 312 may be in a non-circular shape, and the portion of the rotating shaft 414 in the through hole on the first magnetic member 312 matches the through hole on the first magnetic member 312; the through hole on the upper arm 21 may be in a non-circular shape, the portion of the rotating shaft 414 in the through hole on the upper arm 21 matches the through hole on the upper arm 21. The first magnetic member 312 configured in this manner can drive the rotating shaft 414 to rotate, and the rotation of the rotating shaft 414 can in turn drive the upper arm 21 to rotate. The non-circular shape can be, for example, a rectangle. When the driving member 31 is in the first state, the rotation of the second magnetic member 313 drives the first magnetic member 312 to rotate, the first magnetic member 312 drives the rotating shaft 414 to rotate, and the rotation of the rotating shaft 414 drives the upper arm 21 to rotate, so that the control of the upper arm 21 can be realized. When the driving member 31 is in the second state, the magnetic attraction between the first magnetic member 312 and the second magnetic member 313 disappears, the elastic member 311 extends/contracts, and the first magnetic member 312 is separated from the second magnetic member 313, so that the first magnetic member 312 stops driving the rotation of the upper arm 21.

The opposite sides of the first magnetic member 312 and the second magnetic member 313 may be provided with a friction structure. The friction structure may be, for example, bumps, ridges, or the like, so that the friction between the first magnetic member 312 and the second magnetic member 313 may be increased, facilitating the second magnetic member 313 to drive the first magnetic member 312 to rotate.

In one embodiment, the upper arm 21 is provided with an electromagnetic push rod 81. Referring to FIG. 6, the electromagnetic push rod 81 includes a main body 501, a push rod 502 slidably disposed in the main body 501, and a holding portion 503 connected to the push rod 502. When the electromagnetic push rod 81 is energized, the push rod 502 pushes the holding portion 503 to move away from the main body 501, so that the holding portion 503 holds an end potion of the back bracket 10, and the upper arm 21 where the electromagnetic push rod 81 is located stops rotating; when the electromagnetic push rod 81 is de-energized, the push rod 502 moves to the inside of the main body 501 to separate the holding portion 503 from the end portion 811 of the back bracket 10. The electromagnetic push rod 81 is configured such that the upper arm 21 is fixed when the upper arm 21 is rotated to a specified angle to prevent the upper arm 21 from continuing to rotate under the action of gravity.

Inside the main body of the electromagnetic push rod 81, there can be provided with an electromagnet, and the push rod 502 can be a magnet. When the electromagnet is energized, a magnetic force opposite in magnetism to the push rod 502 is generated, so that the electromagnet and the push rod 502 repel each other, and the push rod 502 moves in a direction away from the main body 501 by the repulsive force. When the electromagnet is de-energized, the electromagnet's magnetism disappears, and a magnetic attraction force is generated between the push rod 502 and the electromagnet, so that the push rod 502 moves to the inside of the main body 501 by the magnetic attraction force.

The end portion 811 of the back bracket 10 may be arc-shaped, and the holding portion 503 may be a curved plate fitted to the end portion 811 of the back bracket 10. In this way, the holding portion 503 is fitted to the end portion 811 of the back bracket 10, and the back bracket 10 can be held more securely.

The holding portion 503 of the electromagnetic push rod 81 and the end portion 811 of the back bracket 10 may be respectively provided with rubber friction pads to increase the friction between the holding portion 503 and the end portion 811 of the back bracket 10, so that the holding portion 503 can hold the end portion 811 of the back bracket 10 more securely. Of course, one of the holding portion 503 and the end portion 811 of the back bracket 10 can be provided with a groove, the other is provided with a projection matching the groove, the upper arm 21 is fixed by the cooperation of the projection and the groove.

The electromagnetic push rod 81 can be further provided with a fixing portion 504. The fixing portion 504 can be disposed to cover the main body 501 to fix and protect the main body 501, and the fixing portion 504 can be provided with a mounting hole for mounting on the upper arm 21.

Referring again to FIG. 4, the upper arm 21, the forearm 22, the rotating wheel 42, the drive member 32, and the transmission wheel 92 can be coupled together by a rotating shaft 424 (i.e., a second rotating shaft). Specifically, an end of the upper arm 21 and an end of the forearm 22 are provided with through holes respectively, and a thrust bearing 423 (i.e., a second thrust bearing) is provided inside the through hole on the upper arm 21. The rotating shaft 424 passes through the thrust bearing 423, the through holes on the rotating wheel 42 and the transmission wheel 92 to couple the upper arm 21, the forearm 22, the rotating wheel 42, and the transmission wheel 92 together. Supporting bearings 422 and 425 are disposed at two ends of the rotating shaft 424 respectively, and snap rings 421 and 426 are fixed to the outer sides of the supporting bearings 422 and 425 respectively. Wherein, the upper arm 21 may be disposed at the inner side of the forearm 22, the rotating wheel 42 may be disposed at the outer side of the forearm 22, and the transmission wheel 92 is disposed at the outer side of the rotating wheel 42 to facilitate assembly.

The driving member 32 may include a first magnetic member 322, a second magnetic member 323, and an elastic member 321. In the embodiment shown in FIG. 4, the elastic member 321 is disposed on one side of the first magnetic member 322, and the second magnetic member 323 is disposed on the other side of the first magnetic member 322. For example, the elastic member 321 may be a tension spring. In some other embodiments according to the present disclosure, the elastic member 321 may also be disposed between the first magnetic member 322 and the second magnetic member 323, for example, the elastic member 321 may be a compression spring. The elastic member 321, the first magnetic member 322 and the second magnetic member 323 can be sleeved on the rotating shaft 424 and disposed between the forearm 22 and the rotating wheel 42. Wherein, the second magnetic member 323 is fixed to the inner side of the rotating wheel 42, and the first magnetic member 322 is slidable relative to the rotating shaft 424 in the axial direction of the rotating shaft 424. The through hole on the first magnetic member 322 may be in a non-circular shape, and the portion of the rotating shaft 424 in the through hole on the first magnetic member 322 matches the through hole on the first magnetic member 322; the through hole on the forearm 22 may be in a non-circular shape, the portion of the rotating shaft 424 in the through hole on the forearm 22 matches the through hole on the forearm 22. In the first state, the electromagnet is energized, a magnetic attraction force is generated between the first magnetic member 322 and the second magnetic member 323, to compress the elastic member 321, so that the first magnetic member 322 is attached to the second magnetic member 323. As a result, the first magnetic member 322 can drive the second magnetic member 323 to rotate, the second magnetic member 323 rotates the rotating shaft 424, and the rotation of the rotating shaft 424 drives the forearm 22 to rotate. In the second state, the electromagnet is de-energized, the magnetic attraction between the first magnetic member 322 and the second magnetic member 323 disappears, and the elastic member 321 extends to separate the first magnetic member 322 from the second magnetic member 323, so that the second magnetic 323 stops driving the rotation of the first magnetic member 322, and the rotating shaft 424 and the forearm 22 stop rotating.

The forearm 22, the hand portion 23, the driving member 33 and the rotating wheel 43 can be coupled together by a rotating shaft 434. Specifically, an end portion of the hand portion 23 and the lower end portion of the forearm 22 are provided with through holes respectively. A thrust bearing 433 is disposed in the through hole on the forearm 22. The rotating shaft 434 passes through the thrust bearing 433 and the through hole on the rotating wheel 43 to couple the forearm 22, the hand portion 23 and the rotating wheel 43 together. Supporting bearings 432 and 435 are disposed at two ends of the rotating shaft 434 respectively, and snap rings 431 and 436 are fixed to the outer sides of the supporting bearings 432 and 435 respectively. Wherein, the forearm 22 may be disposed at the inner side of the hand portion 23, and the rotating wheel 43 may be disposed at the outer side of the hand portion 23 to facilitate assembly.

The driving member 33 may include a first magnetic member 332, a second magnetic member 333, and an elastic member 331. In the embodiment shown in FIG. 4, the elastic member 331 is disposed on one side of the first magnetic member 332, and the second magnetic member 333 is disposed on the other side of the first magnetic member 332.

For example, the elastic member 331 may be a tension spring. In some other embodiments according to the present disclosure, the elastic member 331 may also be disposed between the first magnetic member 332 and the second magnetic member 333, for example, the elastic member 331 may be a compression spring. The elastic member 331, the first magnetic member 332 and the second magnetic member 333 can be sleeved on the rotating shaft 434 and disposed between the hand portion 23 and the rotating wheel 43. Wherein, the second magnetic member 333 is fixed to the inner side of the rotating wheel 43, and the first magnetic member 332 is slidable relative to the rotating shaft 434 in the axial direction of the rotating shaft 434. The through hole on the first magnetic member 332 may be in a non-circular shape, and the portion of the rotating shaft 434 in the through hole on the first magnetic member 332 matches the through hole on the first magnetic member 332; the through hole on the hand portion 23 may be in a non-circular shape, and the portion of the rotating shaft 434 in the through hole on the hand portion 23 matches the through hole on the hand portion 23. In the first state, the electromagnet is energized, a magnetic attraction force is generated between the first magnetic member 332 and the second magnetic member 333, the elastic member 331 is compressed, so that the first magnetic member 332 is attached to the second magnetic member 333. As a result, the first magnetic member 332 can drive the second magnetic member 323 to rotate, the second magnetic member 333 rotates the rotating shaft 434, and the rotation of the rotating shaft 434 drives the hand portion 23 to rotate. In the second state, the electromagnet is de-energized, the magnetic attraction between the first magnetic member 332 and the second magnetic member 333 disappears, and the elastic member 331 extends to separate the first magnetic member 332 from the second magnetic member 333, so that the second magnetic 333 stops driving the rotation of the first magnetic member 322, and the rotating shaft 434 and the hand portion 23 stop rotating.

The opposite sides of the first magnetic member 322 and the second magnetic member 323 of the driving member 32 and the opposite sides of the first magnetic member 332 and the second magnetic member 333 of the driving member 33 are respectively provided with a friction structure to increase the friction between the first magnetic member 322 and the second magnetic member 323, and the friction between the first magnetic member 332 and the second magnetic member 333. The friction structure may be, for example, bumps, ridges, or the like.

The forearm 22 can be provided with an electromagnetic push rod 82, which has the similar structure as the electromagnetic push rod 81. When the electromagnetic push rod 82 is energized, the holding portion thereof can hold the lower end portion 821 of the upper arm 21 to fix the forearm 22 when the forearm 22 is rotated to a specified angle; when the electromagnetic push rod 82 is de-energized, the holding portion of the electromagnetic push rod 82 is separated from the end portion 821 of the upper arm 21, so that the forearm 22 can be rotated by the driving member 32.

The hand portion 23 can be provided with an electromagnetic push rod 83, which has the similar structure as the electromagnetic push rod 81. When the electromagnetic push rod 83 is energized, the electromagnetic push rod 83 holds the lower end portion 831 of the forearm 22 to fix the hand portion 23 when the hand portion 23 is rotated to a specified angle; when the electromagnetic push rod 83 is de-energized, the holding portion of the electromagnetic push rod 83 is separated from the end portion 831 of the forearm 22, so that the hand portion 23 can be rotated by the driving member 33.

The holding portion of the electromagnetic push rod 82 and the lower end portion 821 of the upper arm 21 may be respectively provided with rubber friction pads. Alternatively, one of the holding portion of the electromagnetic push rod 82 and the lower end portion 821 of the upper arm 21 is provided with a groove, and the other is provided with a projection matching the groove, such that the holding portion of the electromagnetic push rod 82 can hold the forearm 22 more securely. The holding portion of the electromagnetic push rod 83 and the lower end portion 831 of the forearm 22 may be respectively provided with rubber friction pads. Alternatively, one of the holding portion of the electromagnetic push rod 83 and the lower end portion 831 of the forearm 22 is provided with a groove, and the other is provided with a projection matching the groove, such that the holding portion of the electromagnetic push rod 83 can hold the hand portion 23 more securely.

In another embodiment, each of the driving members 31, 32, 33 may also include a first friction plate (not shown), a second friction plate (not shown), and a sub-driving member (not shown) disposed between the first friction plate and the second friction plates, all of which are sleeved on the rotating shaft. The first friction plate is disposed opposite to the second friction plate, and the second friction plate is fixed on corresponding one of the rotating wheels 41, 42, 43. The sub-driving member can drive the first friction plate to slide toward or away from the second friction plate along the rotating shaft 414. Wherein, the sub-driving member may be a rotary motor and a lever mechanism connected to the rotary motor, and the lever mechanism being coupled to the first friction plate. When the rotary motor is in operation, the lever mechanism converts the rotation of the rotary motor into a linear motion, and drives the first friction plate to move toward the second friction plate, thereby the first friction plate is attached to the second friction plate, so as to enable the second friction plate to drive the first friction plate to rotate. The rotary motor and the lever mechanism can also drive the first friction plate to move away from the second friction plate, thereby separating the first friction plate from the second friction plate. As a result, the second friction plate stops driving the rotation of the first friction plate. The sub-driving member may also be a linear motor disposed between the two friction plates. The linear motor may move the first friction plate toward the second friction plate. The sub-driving member may also be an alloy wire spring. The spring is compressed when the spring is energized, to attach the first friction plate to the second friction plate. The spring extends when the spring is de-energized, to separate the first friction plate from the second friction plate.

In still another embodiment, the rotating wheels 41, 42, 43 may be fixedly coupled to the upper arm 21, the forearm 22 and the hand portion 23 via the rotating shafts 414, 424, 434. The driving members may also include wheel teeth provided on the rotating wheels 41, 42, 43, belt teeth engage with the wheel teeth are provided on the inner surface of the driving belts coupled to the rotating wheels 41, 42, 43. The wheel teeth can retract into the rotating wheels 41, 42, 43 or stick out of the surface of the rotating wheels 41, 42, 43. In the first state, the wheel teeth stick out of the surface of the rotating wheels 41, 42, 43 to enable the motor 50 to rotate the rotating wheels 41, 42, 43 so that the rotating wheels 41, 42, 43 drive the upper arm 21, the forearm 22 and the hand portion 23 to rotate through corresponding rotating shafts 414, 424, 434. In the second state, the teeth retract into the rotating wheels 41, 42, 43, and when the motor 50 rotates, the corresponding rotating wheels 41, 42, 43 do not rotate. Thus, the rotating wheels 41, 42, 43 stop driving the rotation of the upper arm 21, the forearm 22 and the hand portion 23. In this embodiment, the upper limb assist system 100 may include four transmission wheels that are juxtaposed and coupled together, and the four transmission wheels can be rotated simultaneously. The running wheel 51 of the motor 50 is coupled to one of the transmission wheels through a driving belt, and the other three transmission wheels are coupled to the rotating wheel 41 on the upper arm 21, the rotating wheel 42 on the forearm 22, and the rotating wheel 43 on the hand portion 23 through driving belts respectively. When the motor 50 is running, the four transmission wheels are rotated together by the running wheel 51. When the wheel teeth on the rotating wheels 41, 42, 43 stick out of the surface of the rotating wheels 41, 42, 43, the motor 50 can drive the corresponding rotating wheels 41, 42, 43 to rotate through the transmission wheels, which then drive the upper arm 21, the forearm 22 and the hand portion 23 where they are located to rotate. The rotation of the upper arm 21, the forearm 22, and the hand portion 23 can be separately controlled by controlling the teeth of the rotating wheels 41, 42, 43 to stick out or retract into the rotating wheels 41, 42, 43.

In one embodiment, the back bracket 10 may be provided with a first fixing strap 11 for fixing the back bracket 10 to the back of a human body. Preferably, the first fixing strap 11 is respectively disposed on both sides of the back bracket 10, so that the back bracket 10 can be fixed on the back of the human body more securely.

A second fixing strap 24 may be disposed on the upper arm 21 of the arm bracket 20, a second fixing strap 25 is disposed on the forearm 22, and a second fixing strap 26 is disposed on the hand portion 23. The second fixing strap 24 is configured to fix the upper arm 21 to an upper arm of the human body, the second fixing strap 25 is configured to fix the forearm 22 to a forearm of the human body, and the second fixing strap 26 is configured to fix the hand portion 23 to a hand of the human body.

Referring again to FIG. 1, the back bracket 10 can include an upper beam 12, a lower beam 13, and a bar portion 14 that connects the upper beam 12 and the lower beam 13. The upper beam 12 may include a first upper beam 121 and a second upper beam 122. The first upper beam 121 and the second upper beam 122 are respectively provided with a plurality of mounting holes, through which the first upper beam 121 can be connected to the second upper beam 122 with connecting members. The lower beam 13 may include a first lower beam 131 and a second lower beam 132. The first lower beam 131 and the second lower beam 132 are respectively provided with a plurality of mounting holes, through which the first lower beam 131 can be connected to the second lower beam 132 with connecting members.

Further, at least one mounting hole of the first upper beam 121 is aligned with at least one mounting hole of the second upper beam 122 by controlling the length of the first upper beam 121 overlapping the second upper beam 122, and the first upper beam 121 is connected to the second upper beam 122 with a connecting member passing through the aligned mounting holes, so that the overall length of the upper beam 12 can be adjusted. Likewise, the overall length of the lower beam 13 can also be adjusted to be approximately the same as the upper beam 12.

Usually, there are two arm brackets 20 coupled to opposite sides of the back bracket 10 respectively.

In one embodiment, the upper arm 21 may be provided with an angle sensor 71, the forearm 22 may be provided with an angle sensor 72, and/or the hand portion 23 may be provided with an angle sensor 73. The angle sensors 71, 72, and 73 are configured to monitor the angle at which the upper arm 21, the forearm 22, and the hand portion 23 are rotated, respectively. For example, the angle sensor 71 may be configured to monitor an angle of the upper arm 21 relative to the back bracket 10 or an angle of rotation of the upper arm 21; the angle sensor 72 may be configured to monitor an angle of the forearm 22 relative to the upper arm 21 or an angle of rotation of the forearm 22; and the angle sensor 73 may be configured to monitor an angle of the hand portion 23 relative to the forearm 22 or an angle of rotation of the hand portion 23.

The upper limb assist system 100 can be controlled by a control system that can control the operation of the motor 50, the energization and de-energization of the driving members 31, 32, 33, and the energization and de-energization of the electromagnetic push rods 81, 82, 83, and can receive angle information monitored by the angle sensors 71, 72, 73. For example, when it is required to control the forearm 22 to rotate, the control system controls the motor 50 to start running, and controls the driving member 32 to be energized. When the motor 50 is running, the rotating wheel 42 is rotated. The driving member 32 is energized to be in the first state, and the forearm 22 is rotated by the rotation of the rotating wheel 42. While the forearm 22 is rotating, the angle sensor 72 monitors the angle at which the forearm 22 is rotated and sends the angle to the control system. When the control system determines that the forearm 22 has been rotated to a specified angle according to the angle information monitored by the angle sensor 72, the electromagnetic push rod 82 is controlled to be energized, and the lower end portion 821 of the upper arm 21 is held by the holding portion of the electromagnetic push rod 82, so that the forearm 22 is fixed; at the same time, the control system controls to de-energize the driving member 32, and the driving member 32 is switched to the second state to stop the rotation of the forearm 22. The process of controlling the rotation of the upper arm 21 or the hand portion 23 by the control system is similar to the above-described process of controlling the forearm 22, which will not be described herein.

Referring again to FIG. 1, a control panel 80 can be disposed on the inner side of the hand portion 23. The control panel 80 can be provided with at least three buttons, and the user can control the upper arm 21, the forearm 22 and the hand portion 23 separately by pressing different buttons.

Referring to FIG. 7, a housing 93 can be provided outside the upper arm 21, and a housing 94 can be provided outside the forearm 22. The housing 93 encloses the driving member 31, the rotating wheel 41 and the transmission wheel 91. The housing 94 encloses the driving member 32, the rotating wheel 42 and the transmission wheel 92. These housings 93 and 94 can protect internal components of the upper limb assist system 100.

The upper limb assisting system provided by the embodiments of the present application can be applied to human body rehabilitation training to assist the wearer to perform upper limb exercise, and can also be applied to cargo loading and unloading to assist the wearer to load and unload cargoes.

Other embodiments of the present disclosure will readily occur to those skilled in the art upon consideration of the specification and practice of the present disclosure as disclosed herein. This application is intended to cover any variations, uses, or adaptations of the disclosure that follow the general principles of the disclosure and include what is generally known in the art, which is not disclosed in this disclosure, or is dependent on conventional techniques. The specification and the embodiments are to be considered exemplary only, with a true scope and spirit of the invention being disclosed by the following claims.

It should be understood that the present disclosure is not limited to the precise structures that have been described above and shown in the drawings, and that various modifications and changes may be made without departing from the scope thereof. The scope of the present disclosure should be limited only by the attached claims.

What is claimed is:

1. An upper limb assist system including a back bracket, an arm bracket, a motor, and driving belts,
   wherein the arm bracket includes an upper arm, a forearm, and a hand portion, two ends of the forearm are configured to be rotatably coupled to the upper arm and the hand portion respectively, the upper arm is configured to be rotatably coupled to the back bracket,
   the upper limb assist system further includes driving members and corresponding rotating wheels disposed on the upper arm, the forearm and the hand portion respectively, wherein each driving member is configured to have a first state and a second state; in the first state, the driving member is configured to drive the upper arm, the forearm or the hand portion where the driving member is located to rotate with a rotation of the corresponding rotating wheel; in the second state, the driving member is configured to stop driving a rotation of the upper arm, the forearm or the hand portion where the driving member is located,
   the motor is disposed on the arm bracket or the back bracket, and a running wheel of the motor is configured to be directly or indirectly coupled to each of the rotating wheels via the driving belts to cause each of the rotating wheels to rotate when the motor is running,
   wherein the back bracket, the upper arm and a corresponding rotating wheel are coupled together by a first rotating shaft,
   an end of the upper arm and an end of the back bracket are provided with through holes respectively, and a first thrust bearing is disposed in the through hole on the back bracket, wherein the first rotating shaft is configured to pass through the first thrust bearing, the through hole of the corresponding rotating wheel, thereby coupling the upper arm and the back bracket and the corresponding rotating wheel together.

2. The upper limb assist system according to claim 1, wherein the driving member include a first magnetic member disposed on the arm bracket, a second magnetic member disposed on the corresponding rotating wheel and opposite to the first magnetic member, and an elastic member, at least one of the first magnetic member and the second magnetic member is an electromagnet; in the first state, the electromagnet is energized to make the first magnetic member and the second magnetic member attract each other to overcome an elastic force of the elastic member, so that the first magnetic member is attached to the second magnetic member, and the second magnetic member is driven to rotate when the first magnetic member rotates; in the second state, the electromagnet is de-energized, magnetic attraction between the first magnetic member and the second magnetic member disappears, and the elastic force of the elastic member separates the first magnetic member from the second magnetic member.

3. The upper limb assist system according to claim 2, wherein the first magnetic member and the second magnetic member are provided with a friction structure on opposite sides of the first magnetic member and the second magnetic member.

4. The upper limb assist system according to claim 2, wherein the elastic member is disposed between the first magnetic member and the second magnetic member.

5. The upper limb assist system according to claim 2, wherein the elastic member and the second magnetic member are disposed on two sides of the first magnetic member respectively.

6. The upper limb assist system according to claim 1, wherein each rotating wheel is configured to be fixedly coupled to the arm bracket, the driving member includes wheel teeth provided on the rotating wheel, an inner surface of a corresponding driving belt is provided with belt teeth engaged with the wheel teeth, in the first state, the wheel teeth are configured to stick out of a surface of the rotating wheel to engage with the belt teeth, in the second state, the wheel teeth are configured to retract into the rotating wheel to disengage with the belt teeth.

7. The upper limb assist system of claim 1, wherein the arm bracket further comprises electromagnetic push rods disposed on the upper arm, the forearm and/or the hand portion, each electromagnetic push rod comprises a main body, a push rod slidably disposed in the main body and a holding portion connected to the electromagnetic push rod, when the electromagnetic push rod is energized, the push rod is configured to push the holding portion to move away from the main body, so that the holding portion contacts an end portion of the back bracket, the upper arm or the forearm, thereby fixing the upper arm, the forearm or the hand portion where the electromagnetic push rod is located; when the electromagnetic push rod is de-energized, the electromagnetic push rod is configured to move toward the main body to drive the holding portion to be separated from the corresponding end portion, wherein the end portions of the back bracket, the upper arm and the forearm are arc-shaped, and the holding portions are curved plates fitted to the respective end portions.

8. The upper limb assist system according to claim 1, wherein the back bracket is provided with a first fixing belt, and the upper arm, the forearm and the hand portion are provided with second fixing belts respectively.

9. The upper limb assist system according to claim 1, wherein two arm brackets are configured to be coupled to opposite sides of the back bracket respectively.

10. The upper limb assist system according to claim 9, wherein a length of the back bracket between the two arm brackets is adjustable.

11. The upper limb assist system of claim 1, wherein the upper arm, the forearm and/or the hand portion are provided with angle sensors for monitoring an angle of rotation of the upper arm, the forearm or the hand portion.

12. The upper limb assist system according to claim 1, wherein both ends of the first rotating shaft are provided with support bearings respectively.

13. The upper limb assist system according to claim 12, wherein a snap ring is fixed to an outer side of the corresponding support bearing.

14. The upper limb assist system of claim 1, wherein the upper arm, the forearm and the corresponding rotating wheel are coupled together by a second rotating shaft.

15. The upper limb assisting system according to claim 14, wherein another end of the upper arm and an end of the forearm are provided with through holes respectively, and a second thrust bearing is disposed in the through hole on the other end of the upper arm, wherein the second rotating shaft is configured to pass through the second thrust bearing, the through hole of the corresponding rotating wheel, thereby coupling the upper arm and the forearm and the corresponding rotating wheel together.

16. The upper limb assist system according to claim 15, wherein both ends of the second rotating shaft are provided with support bearings respectively.

17. The upper limb assist system according to claim 16, wherein a snap ring is fixed to an outer side of the corresponding support bearing.

* * * * *